（12） United States Patent
Kobayashi et al.

(10) Patent No.: US 9,702,292 B2
(45) Date of Patent: Jul. 11, 2017

(54) EXHAUST HEAT RECOVERY DEVICE

(71) Applicant: FUTABA INDUSTRIAL CO., LTD., Aichi (JP)

(72) Inventors: Arata Kobayashi, Aichi (JP); Hirohisa Okami, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 215 days.

(21) Appl. No.: 14/415,233

(22) PCT Filed: Jul. 19, 2013

(86) PCT No.: PCT/JP2013/069633
§ 371 (c)(1),
(2) Date: Jan. 16, 2015

(87) PCT Pub. No.: WO2014/014080
PCT Pub. Date: Jan. 23, 2014

(65) Prior Publication Data
US 2015/0184571 A1    Jul. 2, 2015

(30) Foreign Application Priority Data
Jul. 20, 2012  (JP) .................................. 2012-161816

(51) Int. Cl.
*B60H 1/00*          (2006.01)
*F01N 5/02*          (2006.01)
(Continued)

(52) U.S. Cl.
CPC .............. *F01N 5/02* (2013.01); *F28D 7/005* (2013.01); *F28D 7/024* (2013.01); *F28D 9/0043* (2013.01);
(Continued)

(58) Field of Classification Search
CPC .... F01N 5/02; F01N 2240/02; F01N 2240/36; F28D 7/005; F28D 7/024; F28D 7/12;
(Continued)

(56) References Cited

U.S. PATENT DOCUMENTS

2004/0025501 A1* 2/2004 Endoh ..................... F01N 3/043
60/320
2010/0251702 A1* 10/2010 Shikazono ................ F01N 5/02
60/320
(Continued)

FOREIGN PATENT DOCUMENTS

CN          102536402 A       7/2012
JP          S62-112473 U      7/1987
(Continued)

OTHER PUBLICATIONS

International Search Report issued in corresponding International Patent Application No. PCT/JP2013/069633 dated Sep. 3, 2013.

*Primary Examiner* — Travis Ruby
(74) *Attorney, Agent, or Firm* — Morgan, Lewis & Bockius LLP

(57) ABSTRACT

In an exhaust heat recovery device, exhaust gas flows out from a heat exchange outflow port into a heat exchange passage. The exhaust gas having flowed out into the heat exchange passage flows in a radial direction from an inner side to an outer side of a heat exchanger to reach a second heat exchange passage from a first heat exchange passage. A heat exchange is performed in the heat exchanger while the exhaust gas flows.

9 Claims, 9 Drawing Sheets

(51) Int. Cl.
*F28D 7/00* (2006.01)
*F28D 7/02* (2006.01)
*F28D 9/00* (2006.01)
*F28D 21/00* (2006.01)
*F28F 9/02* (2006.01)

(52) U.S. Cl.
CPC ...... *F28D 21/0003* (2013.01); *F01N 2240/02* (2013.01); *F01N 2240/36* (2013.01); *F28F 9/0265* (2013.01); *F28F 2250/00* (2013.01); *Y02T 10/16* (2013.01)

(58) Field of Classification Search
CPC ............... F28D 9/0043; F28D 21/0003; F28F 2250/06; F28F 9/0265; F28F 2250/00; Y02T 10/16; B60H 1/025
USPC .......................................................... 165/41
See application file for complete search history.

(56) References Cited

U.S. PATENT DOCUMENTS

| | | | |
|---|---|---|---|
| 2012/0011836 A1* | 1/2012 | Bruck | F01N 5/025 60/320 |
| 2012/0144814 A1* | 6/2012 | Won | F01M 5/001 60/320 |

FOREIGN PATENT DOCUMENTS

| | | |
|---|---|---|
| JP | 2007-270702 A | 10/2007 |
| JP | 2007-270720 A | 10/2007 |
| JP | 2009-114995 A | 5/2009 |
| JP | 2009-144606 A | 7/2009 |
| JP | 2012-122471 A | 6/2012 |

* cited by examiner

EXHAUST HEAT RECOVERY DEVICE

TECHNICAL FIELD

The present invention relates to an exhaust heat recovery device that performs a heat exchange between exhaust gas discharged from an internal combustion engine and a heat exchange medium.

BACKGROUND ART

There have been proposed various aspects of an exhaust heat recovery device that performs a heat exchange between exhaust gas discharged from an internal combustion engine and a heat exchange medium. An exhaust heat recovery device disclosed in Patent Literature 1 described below adopts a configuration in which a plurality of cylindrical members is disposed to form an inner space where a sound muffling mechanism is formed and an outer space where a heat exchanger is disposed. This exhaust heat recovery device is configured such that when an on-off valve disposed on a downstream side of the inner space is closed, exhaust gas flows into the outer space to exchange heat with a heat exchange medium in the heat exchanger and then flows out to a downstream side. Meanwhile, when the on-off valve is opened, the exhaust gas flows into the inner space and then flows out to the downstream side without exchanging heat.

An exhaust heat recovery device disclosed in Patent Literature 2 described below adopts a configuration in which a plurality of cylindrical members is disposed to form an inner space and an outer space where a heat exchanger is disposed. This exhaust heat recovery device is configured such that when a shutoff valve disposed on a downstream side of the inner space is closed, exhaust gas flows into the outer space to exchange heat with a heat exchange medium in the heat exchanger and then flows out to a downstream side. Meanwhile, when the shutoff valve is opened, the exhaust gas flows into the inner space and then flows out to the downstream side without exchanging heat.

Further, the heat exchanger disclosed in Patent Literature 2 described below is formed with a tube laminate in which a plurality of flat tubes each formed as a tube having a pair of cutout portions in which an upper and a lower portion of a hollow, flat, circular donut shape are linearly cut out, is laminated to overlap with each other. This tube laminate is fitted to a case with an exhaust inflow side end plate and an exhaust outflow side end plate. A cutout portion provided on the exhaust inflow side end plate is disposed to correspond to one of the cutout portions of the tube laminate. Further, a cutout portion provided on the exhaust outflow side end plate is disposed to correspond to the other cutout portion of the tube laminate.

In the exhaust heat recovery device disclosed in Patent Literature 2 described below, the shutoff valve is closed during warming up of an internal combustion engine, the exhaust gas flows out from one of the cutout portions to the tube laminate side and flows through a gap between the respective flat tubes from the top to the bottom as a whole. When the exhaust gas flows in, the heat exchange medium flows inside the respective flat tubes from the bottom to the top as a whole to exchange heat with the exhaust gas, and the exhaust heat is recovered.

CITATION LIST

Patent Literature

[Patent Literature 1]
  Japanese Patent Laid-Open No. 2007-270702
[Patent Literature 2]
  Japanese Patent Laid-Open No. 2009-114995

SUMMARY OF INVENTION

Technical Problem

In an exhaust heat recovery device, when heat recovery is not performed, it is preferable that exhaust gas flows only to an inner space and avoid flowing to an outer space. However, in the exhaust heat recovery device described in Patent Literature 1 and the exhaust heat recovery device described in Patent Literature 2, even though the inner space and the outer space diverge on an upstream side, the on-off valve or the shutoff valve functioning as a switching valve is disposed on the downstream side, and therefore even if the switching valve is opened, the outflow of the exhaust gas to the outer space is not avoidable.

In an exhaust heat recovery device, when heat recovery is performed, it is necessary that exhaust gas comes in contact with the whole heat exchanger in order to increase heat exchange efficiency. In the exhaust heat recovery device described in Patent Literature 1, since the exhaust gas is introduced simply from the upstream side, the exhaust gas comes in contact with only near a surface of a peripheral portion of the heat exchanger, and the exhaust gas is difficult to reach an inside of the heat exchanger. Further, in the exhaust heat recovery device described in Patent Literature 2, the exhaust gas is introduced from one of the upper and lower (for example, upper) cutout portions and discharged from the other one of the upper and lower (for example, lower) cutout portions. However, in this case also, since the exhaust gas comes in contact with only near a surface of a peripheral portion of the heat exchanger, and in addition, the exhaust gas flows diagonally, the exhaust gas is difficult to come in contact with the flat tube on a side where the cutout portion is not formed, and parts where the exhaust gas does not reach are rather increased. More specifically, when the exhaust gas is introduced from the upper cutout portion on an inlet side, most part of the exhaust gas flow flows toward the lower cutout portion on an outlet side. Therefore, the exhaust gas reaches an upper area on the inlet side and a lower area on the outlet side, but the gas flow stagnates on a lower area on the inlet side and an upper area on the outlet side, and thus the exhaust gas is difficult to reach there. Further, in the exhaust heat recovery device in Patent Literature 2, there is also a problem that since the exhaust gas hits on a cylindrical portion of the outer side at first and heat is taken to some extent with the cylindrical portion of the outer side and then the heat exchange is performed in the heat exchanger, the heat exchange efficiency is decreased.

The present invention has been made in view of the above problems and an object thereof is to provide an exhaust heat recovery device in which when heat recovery is not performed, exhaust gas does not flow into a space side where a heat exchanger is provided as much as possible, when the heat recovery is performed, the exhaust gas can reach the whole heat exchanger, and heat exchange efficiency can be improved.

Solution to Problem

In order to solve the above problems, an exhaust heat recovery device according to the present invention is an exhaust heat recovery device performing a heat exchange between exhaust gas discharged from an internal combustion engine and a heat exchange medium, including (1) an inner member forming a part of a main passage that connects a receiving inlet receiving the exhaust gas flowing from an upstream side to a main sending outlet sending the received exhaust gas into a downstream side, and forming an upstream side main passage, which is a part of the receiving inlet side of the main passage, (2) an outer member disposed to surround the inner member and forming a heat exchange passage with the inner member, (3) a heat exchanger disposed on the heat exchange passage to surround the inner member and performing the heat exchange between the exhaust gas and the heat exchange medium, and (4) a switching unit switching between a first mode in which the exhaust gas received with the main passage is passed through only the main passage to flow into the main sending outlet, and a second mode in which the exhaust gas received with the main passage flows from the upstream side main passage through the heat exchange passage into a subsending outlet different from the main sending outlet. In the exhaust heat recovery device according to the present invention, the heat exchange passage includes a first heat exchange passage formed between the heat exchanger and the inner member, and a second heat exchange passage formed between the heat exchanger and the outer member. In the exhaust heat recovery device according to the present invention, the inner member and the heat exchanger are disposed such that a heat exchange outflow port through which the exhaust gas flows out from the upstream side main passage into the first heat exchange passage is formed on an end of the first heat exchange passage on the main sending outlet side. In the exhaust heat recovery device according to the present invention, in the second mode, the exhaust gas flows out from the heat exchange outflow port into the heat exchange passage, the exhaust gas having flowed out into the heat exchange passage flows in a radial direction from an inner side to an outer side of the heat exchanger to reach the second heat exchange passage from the first heat exchange passage, and the heat exchange is performed in the heat exchanger while the exhaust gas flows.

According to the present invention, since the heat exchange outflow port through which the exhaust gas flows out from the main passage into the first heat exchange passage is formed on the end of the first heat exchange passage on the main sending outlet side, the heat exchange outflow port can be formed near the switching unit. By contriving the disposition of the heat exchange outflow port in this manner, in the case where the exhaust gas flow of the first mode is formed by operating the switching unit, a pressure difference between the path from the heat exchange outflow port to the subsending outlet through the heat exchange passage and the main passage can be small. Therefore, during the first mode, it is possible to prevent the exhaust gas from entering into the heat exchange passage side and allow the exhaust gas to flow directly to the main sending outlet through the main passage.

Further, according to the present invention, in the second mode, when an end of the main passage is blocked by operating the switching unit, the exhaust gas flows out from the heat exchange outflow port to the heat exchange passage. In the present invention, since the exhaust gas having flowed out into the heat exchange passage flows from the first heat exchange passage in the radial direction from the inner side to the outer side of the heat exchanger to reach the second heat exchange passage, the exhaust gas can reach the whole heat exchanger throughout to exchange heat with the heat exchange medium. Therefore, it is possible to allow the exhaust gas to reach the whole heat exchanger during the second mode and increase the heat exchange efficiency.

In the exhaust heat recovery device according to the present invention, it is preferable that an upstream side end plate blocking an upstream end of the heat exchange passage is disposed between the inner member and the outer member such that the exhaust gas is prevented from flowing from an upstream side into the heat exchange passage.

In this preferable aspect, by disposing the upstream side end plate that blocks the upstream end of the heat exchange passage between the inner member and the outer member, it is possible to certainly prevent the exhaust gas from entering into the heat exchange passage from the upstream side and obtain the exhaust gas flow of the first mode in which the exhaust gas flows from the heat exchange outflow port into the heat exchange passage.

In the exhaust heat recovery device according to the present invention, it is preferable that a downstream side end plate blocking a downstream end of the first heat exchange passage is disposed between the inner member and the outer member such that the exhaust gas flowing out from the heat exchange outflow port is introduced into the first heat exchange passage.

In this preferable aspect, by disposing the downstream side end plate that blocks the downstream end of the first heat exchange passage between the inner member and the outer member, the exhaust gas flowing out from the heat exchange outflow port can be certainly introduced into the first heat exchange passage. Therefore, it is possible to obtain the exhaust gas flow of the second mode in which the exhaust gas having flowed out from the heat exchange outflow port enters into the first heat exchange passage at first and exchanges heat while crossing the heat exchanger in the radial direction to flow out to the second heat exchange passage.

In the exhaust heat recovery device according to the present invention, it is preferable that the heat exchanger is formed to have a shape along the inner member and the outer member and includes a plurality of heat exchanger simple components disposed while being laminated with a predetermined interval therebetween, performs the heat exchange by the flowing of the heat exchange medium inside the heat exchanger simple component and the flowing of the exhaust gas on a heat exchange area between the plurality of heat exchanger simple components, and is disposed with diffusion means diffusing the exhaust gas flowing into the heat exchange area in a circumferential direction of the heat exchange area.

In this preferable aspect, since the heat exchanger is configured such that the plurality of heat exchanger simple components is disposed while having the heat exchange area through which the exhaust gas passes therebetween, the exhaust gas from the first heat exchange passage toward the second heat exchange passage can flow through the heat exchange area. Further, even if the exhaust gas flowing into the first heat exchange passage leans in a circumferential direction, since the diffusion means that diffuses the exhaust gas flowing into the heat exchange area to the space is provided, the exhaust gas can reach an area into which little exhaust gas has flowed from an area into which much exhaust gas has flowed. Therefore, the exhaust gas can reach the whole heat exchanger and can exchange heat with the heat exchange medium more efficiently.

In the exhaust heat recovery device according to the present invention, it is preferable that the diffusion means partially restricts the flowing of the exhaust gas from the first heat exchange passage to the heat exchange area.

In this preferable aspect, since the inflow of the exhaust gas to the heat exchange area is partially restricted, even if much exhaust gas flows into some of the heat exchange areas while leaning, it can be restricted and an appropriate amount of the exhaust gas is allowed to flow in. The surplus exhaust gas hindered from flowing in goes round and flows into the other area of the heat exchange area. As a result, the exhaust gas can reach the area into which little exhaust gas has flowed from the area into which much exhaust gas has flowed by the simple method of partially restricting the flowing of the exhaust gas into the heat exchange area.

In the exhaust heat recovery device according to the present invention, it is preferable that the diffusion means includes a first convex portion formed on the heat exchanger simple component on the first heat exchange passage side.

In this preferable aspect, since the first convex portion partially restricts the inflow of the exhaust gas to the heat exchange area, even if much exhaust gas flows into some of the heat exchange areas while leaning, the first convex portion can restrict it and allow an appropriate amount of the exhaust gas to flow in. The surplus exhaust gas hindered from flowing in with the first convex portion goes round and flows into the other area of the heat exchange area. As a result, the exhaust gas can reach the area into which little exhaust gas has flowed from the area into which much exhaust gas has flowed by the simple method of providing the projecting first convex portion on the heat exchange area.

In the exhaust heat recovery device according to the present invention, it is preferable that the diffusion means includes a first plate part disposed along an inner side surface of the heat exchanger between the inner side surface of the heat exchanger and the first heat exchange passage.

In this preferable aspect, since the first plate part partially restricts the inflow of the exhaust gas to the heat exchange area, even if much exhaust gas flows into some of the heat exchange areas while leaning, the first plate part can restrict it and allow an appropriate amount of the exhaust gas to flow in. The surplus exhaust gas hindered from flowing in with the first plate part goes round and flows into the other area of the heat exchange area. As a result, the exhaust gas can reach the area into which little exhaust gas has flowed from the area into which much exhaust gas has flowed by the simple method of providing the first plate part along the inner side surface of the heat exchanger.

In the exhaust heat recovery device according to the present invention, it is preferable that the diffusion means partially restricts the flowing of the exhaust gas from the heat exchange area to the second heat exchange passage.

In this preferable aspect, since the outflow of the exhaust gas from the heat exchange area to the second heat exchange passage is partially restricted, a traveling direction of the exhaust gas flowing in the heat exchange area can be changed, and time during which the exhaust gas is in contact with the heat exchanger simple component can be longer. As a result, the time during which the exhaust gas is in contact with the heat exchanger simple component can be obtained longer, and the heat exchange efficiency can be increased by the simple method of partially restricting the flowing of the exhaust gas from the heat exchange area to the second heat exchange passage.

In the exhaust heat recovery device according to the present invention, it is preferable that the diffusion means includes a second convex portion formed on the heat exchanger simple component on the second heat exchange passage side.

In this preferable aspect, since the second convex portion partially restricts the outflow of the exhaust gas from the heat exchange area to the second heat exchange passage, the traveling direction of the exhaust gas flowing in the heat exchange area can be changed, and the time during which the exhaust gas is in contact with the heat exchanger simple component can be longer. As a result, the time during which the exhaust gas is in contact with the heat exchanger simple component can be obtained longer, and the heat exchange efficiency can be increased by the simple method of providing the second convex portion on the heat exchange area.

In the exhaust heat recovery device according to the present invention, it is preferable that the diffusion means includes a second plate part disposed along an outer side surface of the heat exchanger between the outer side surface of the heat exchanger and the second heat exchange passage.

In this preferable aspect, since the second convex portion partially restricts the outflow of the exhaust gas from the heat exchange area to the second heat exchange passage, the traveling direction of the exhaust gas flowing in the heat exchange area can be changed, and the time during which the exhaust gas is in contact with the heat exchanger simple component can be longer. As a result, the time during which the exhaust gas is in contact with the heat exchanger simple component can be obtained longer, and the heat exchange efficiency can be increased by the simple method of providing the second convex portion on the heat exchange area.

Advantageous Effects of Invention

According to the present invention, it is possible to provide an exhaust heat recovery device in which when heat recovery is not performed, exhaust gas does not flow into a space side where a heat exchanger is provided as much as possible, when the heat recovery is performed, the exhaust gas can reach the whole heat exchanger, and heat exchange efficiency can be improved.

DESCRIPTION OF EMBODIMENT

With reference to the accompanying drawings, hereinafter, description is given of an embodiment of the present invention. The same constituent elements in each drawing are given the same reference signs as much as possible for easy understanding of the description, and repeated description is omitted.

Figure 1:
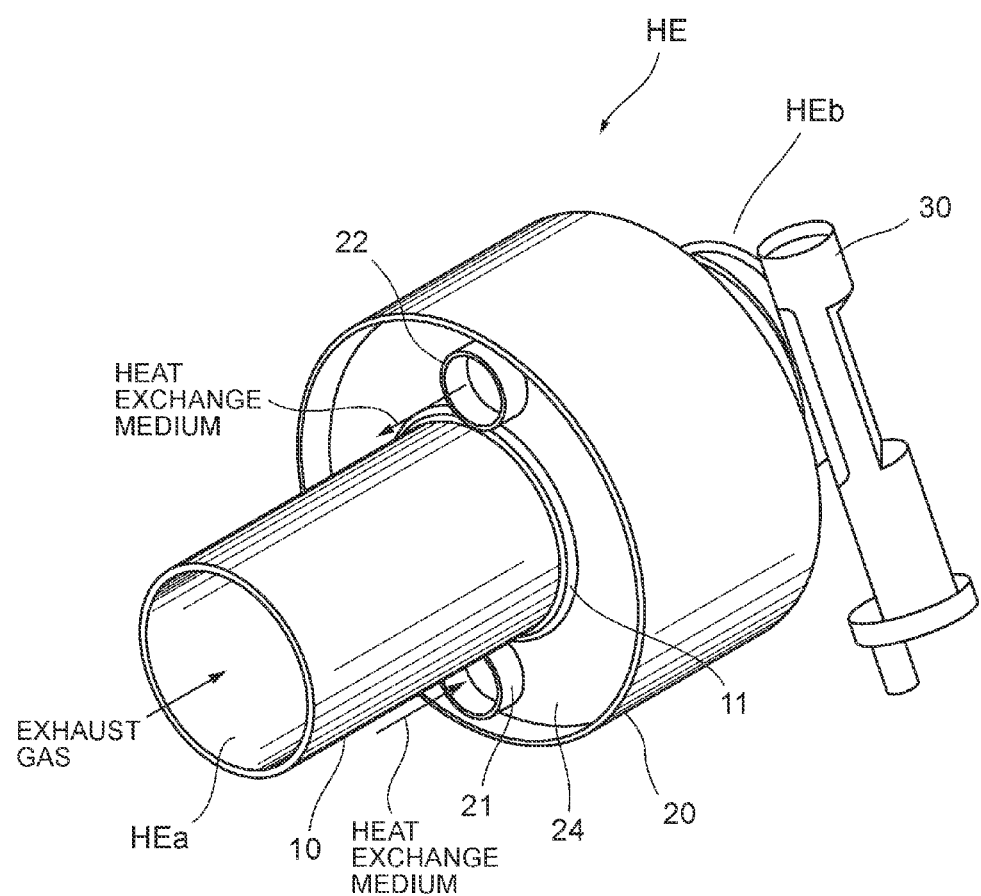
FIG. 1 is a perspective view illustrating a schematic configuration of an exhaust heat recovery device of an embodiment of the present invention.

With reference to FIG. 1, description is given of an exhaust heat recovery device of the embodiment of the present invention. FIG. 1 is a perspective view illustrating a schematic configuration of the exhaust heat recovery device HE of the embodiment of the present invention. The exhaust heat recovery device HE is mounted on, for example, a car, and performs a heat exchange between exhaust gas discharged from an internal combustion engine of the car and a heat exchange medium. The exhaust heat recovery device HE is provided with a receiving inlet HEa that receives the exhaust gas flowing from an upstream side, and a main sending outlet HEb that sends the received exhaust gas to a downstream side.

The exhaust heat recovery device HE includes an upstream side exhaust pipe 10, an inner cylinder 11, an outer cylinder 20, a medium inlet 21, a medium outlet 22, an upstream side end plate 24, and a switching valve 30 (switching unit). The upstream side exhaust pipe 10 is connected to the inner cylinder 11, and they configure a main passage where the exhaust gas flows. Therefore, the inner cylinder 11 forms a part of the main passage connecting the receiving inlet HEa to the main sending outlet HEb.

The outer cylinder 20 is disposed to surround the inner cylinder 11 coaxially and forms a heat exchange passage therebetween. The medium inlet 21 is an inlet part from which the heat exchange medium is supplied to a heat exchanger (not illustrated in FIG. 1) inside the heat exchange passage. The medium outlet 22 is an outlet part from which the heat exchange medium having been supplied from the medium inlet 21 and having exchanged heat with the exhaust gas is discharged. The heat exchange medium to be used is a liquid used for cooling the internal combustion engine.

The switching valve 30 is provided on the main sending outlet HEb on a downstream side of the inner cylinder 11, and is a valve that opens and closes an end of the main passage.

Figure 2:
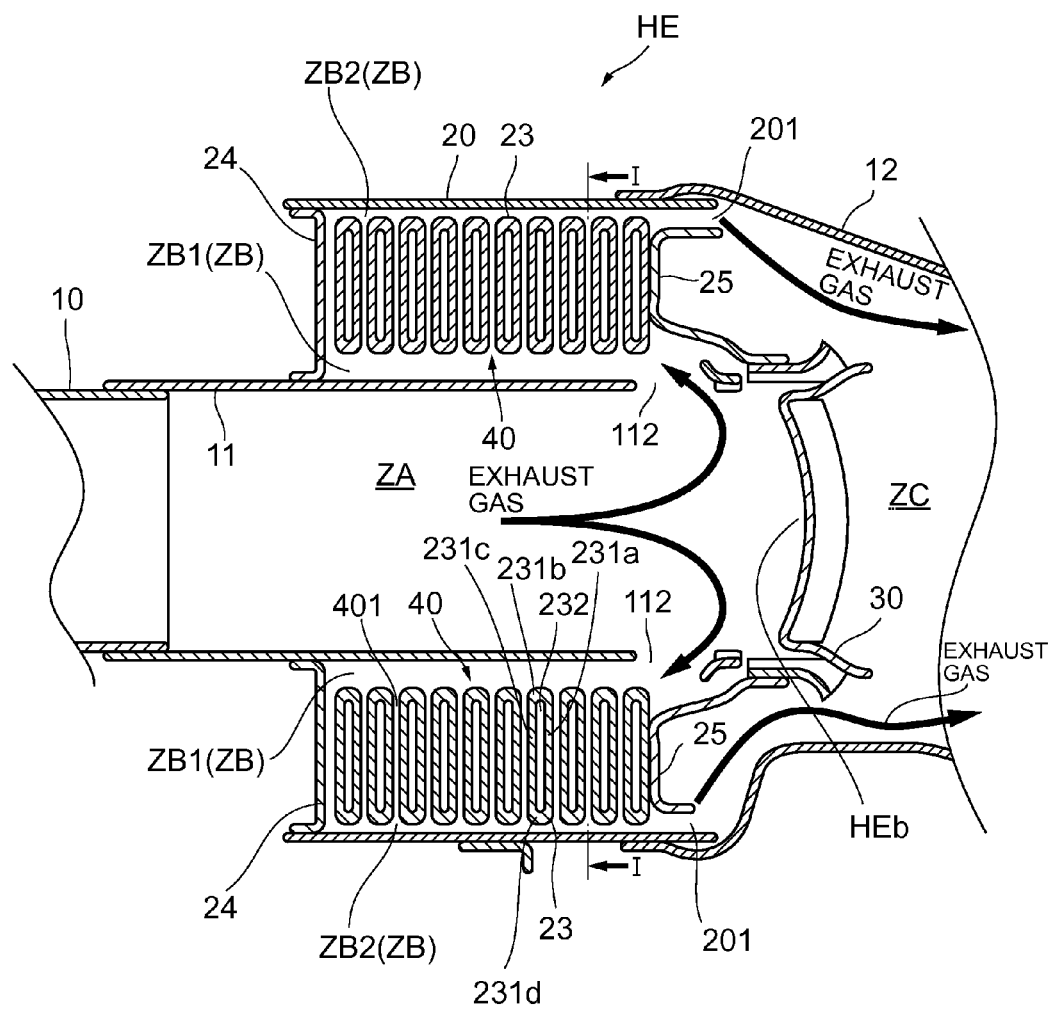
FIG. 2 is a partial schematic sectional view of the exhaust heat recovery device of the embodiment of the present invention.

Next, with reference to FIG. 2, description of the exhaust heat recovery device HE is continued. FIG. 2 is a partial schematic sectional view of the exhaust heat recovery device HE. As already described, the upstream side exhaust pipe 10 and the inner cylinder 11 are connected and form the upstream side main passage ZA. The outer cylinder 20 and the inner cylinder 11 are disposed to have the same central axis, and the outer cylinder 20 is configured to have an inner diameter larger than an outer diameter of the inner cylinder 11. Therefore, the space is formed between the inner cylinder 11 and the outer cylinder 20 and forms the heat exchange passage ZB.

The upstream side end plate 24 is disposed to connect the inner cylinder 11 to the outer cylinder 20. The upstream side end plate 24 is an annular plate fixed such that it connects the vicinity of an upstream end of the outer cylinder 20 to a periphery of the inner cylinder 11. The upstream side end plate 24 is disposed to block the upstream end of the heat exchange passage ZB.

By disposing the upstream side end plate 24 that blocks the upstream end of the heat exchange passage ZB between the inner cylinder 11 and the outer cylinder 20 in this manner, it is possible to certainly prevent the exhaust gas from flowing into the heat exchange passage ZB from the upstream side and obtain an exhaust gas flow of a first mode in which the exhaust gas flows from a side outflow port 112 into the heat exchange passage ZB.

The heat exchanger 40 is disposed on the heat exchange passage ZB. The heat exchanger 40 is disposed to surround the inner cylinder 11 on the heat exchange passage ZB, has a cylindrical outer shape, and performs the heat exchange between the exhaust gas and the heat exchange medium. The heat exchanger 40 is disposed apart from the inner cylinder 11 with a predetermined distance and also apart from the outer cylinder 20 with a predetermined distance. By disposing the heat exchanger 40 in this manner, a first heat exchange passage ZB1 is formed between the heat exchanger 40 and the inner cylinder 11, and also a second heat exchange passage ZB2 is formed between the heat exchanger 40 and the outer cylinder 20.

On a downstream end of the inner cylinder 11, there is formed the side outflow port 112 (heat exchange outflow port) for allowing the exhaust gas to flow out from the upstream side main passage ZA to the first heat exchange passage ZB1. The side outflow port 112 is formed not on the receiving inlet HEa side, but on the main sending outlet HEb side. More specifically, the side outflow port 112 is formed such that a side surface of the inner cylinder 11 opens near the downstream end of the heat exchange passage ZB.

A downstream side end plate 25 that blocks a downstream end of the first heat exchange passage ZB1 is disposed between the inner cylinder 11 and the outer cylinder 20 such that the exhaust gas flowing out from the side outflow port 112 is introduced into the first heat exchange passage ZB1. The downstream side end plate 25 is disposed to connect the inner cylinder 11 on the downstream side of the side outflow port 112 or the switching valve 30 to the downstream side end of the heat exchanger 40. Meanwhile, the downstream side end plate 25 is not connected to the outer cylinder 20, and a subsending outlet 201 is formed between the downstream side end plate 25 and the outer cylinder 20.

By disposing the downstream side end plate 25 that blocks the downstream end of the first heat exchange passage ZB1 between the inner cylinder 11 and the outer cylinder 20 in this manner, the exhaust gas flowing out from the side outflow port 112 can be certainly introduced into the first heat exchange passage ZB1. Therefore, it is possible to obtain an exhaust gas flow of a second mode in which the exhaust gas having flowed out from the side outflow port 112 enters into the first heat exchange passage ZB1 at first and exchanges heat while crossing the heat exchanger 40 in a radial direction to flow out to the second heat exchange passage ZB2. The exhaust gas having flowed into the second heat exchange passage ZB2 flows from the subsending outlet 201 to a downstream side main passage ZC.

The switching valve 30 is disposed on a boundary between the downstream end and the upstream side main passage ZA of the inner cylinder 11, and the downstream side main passage ZC. The downstream side exhaust pipe 12 is provided to cover the switching valve 30 and form the downstream side main passage ZC. The downstream side exhaust pipe 12 is a pipe connected to the downstream side of the outer cylinder 20.

With the configuration described above, by opening and closing the switching valve 30, which is the switching unit, it is possible to choose between the first mode in which the exhaust gas received with the upstream side main passage ZA is passed through the upstream side main passage ZA to flow into the main sending outlet HEb, and the second mode in which the exhaust gas received with the upstream side main passage ZA flows from the upstream side main passage ZA into the subsending outlet 201 through the heat exchange passage ZB.

In the exhaust heat recovery device HE, as described above, the first heat exchange passage ZB1 is formed between the heat exchanger 40 and the inner cylinder 11, the second heat exchange passage ZB2 is formed between the heat exchanger 40 and the outer cylinder 20, the side outflow port 112 through which the exhaust gas flows out from the upstream side main passage ZA to the first heat exchange passage ZB1 is formed on the upstream side, and the main sending outlet HEb of the first heat exchange passage ZB1 is formed on the downstream side. Further, in the exhaust heat recovery device HE, in the second mode, the exhaust gas flows out from the side outflow port 112 into the heat exchange passage ZB, and the exhaust gas having flowed into the heat exchange passage ZB flows from the first heat exchange passage ZB1 in the radial direction from the inner side to the outer side of the heat exchanger 40 to reach the second heat exchange passage ZB2. While the exhaust gas flows, the heat exchange is performed in the heat exchanger 40.

According to the present embodiment, since the side outflow port 112 through which the exhaust gas flows out from the upstream side main passage ZA to the first heat exchange passage ZB1 is formed on the end of the first heat exchange passage ZB1 on the main sending outlet HEb side, the side outflow port 112 can be formed near the switching valve 30. By contriving the disposition of the side outflow port 112 in this manner, in the case where the exhaust gas flow of the first mode is formed by operating the switching valve 30, a pressure difference between the path from the side outflow port 112 to the subsending outlet 201 through the heat exchange passage ZB and the main passage from the upstream side main passage ZA to the downstream side main passage ZC can be small. Therefore, during the first mode, it is possible to prevent the exhaust gas from entering into the heat exchange passage ZB side and allow the exhaust gas to flow directly from the main sending outlet HEb to the downstream side main passage ZC through the main passage.

Further, in the second mode, when the downstream end of the upstream side main passage ZA, which is a halfway position of the main passage, is blocked by operating the switching valve, the exhaust gas flows out from the side outflow port 112 to the heat exchange passage ZB. In this embodiment, since the exhaust gas having flowed out into the heat exchange passage ZB flows from the first heat exchange passage ZB1 in the radial direction from the inner side to the outer side of the heat exchanger 40 to reach the second heat exchange passage ZB2, the exhaust gas can reach the whole heat exchanger 40 throughout and substantially uniformly to exchange heat with the heat exchange medium. Therefore, during the second mode, it is possible to allow the exhaust gas to reach the whole heat exchanger 40 and increase the heat exchange efficiency.

Detailed description is given of the contrivance for allowing the exhaust gas to flow such that it crosses the heat exchanger 40 in the radial direction in this manner. The heat exchanger 40 includes a plurality of heat exchanger simple components 23, each of which has a shape along the inner cylinder 11 and the outer cylinder 20 and is formed to be capable of being disposed while being laminated with a predetermined interval therebetween.

The plurality of heat exchanger simple components 23 is disposed while being laminated apart from each other to form an inner heat exchange passage 401. The heat exchanger simple component 23 is a disk-like member having an annular shape and a hole formed on its center part. The heat exchanger simple component 23 is configured with a first annular side 231*a*, an inner circle side 231*b*, second annular side 231*c*, and an outer circle side 231*d*, which are connected to form an inner space 232 in which the heat exchange medium flows.

The first annular side 231*a* and the second annular side 231*c* are side surfaces disposed to face each other and having the same shape as each other. The first annular side 231*a* and the second annular side 231*c* are the disk-like members having the annular shape and the hole formed on its center part.

The inner circle side 231*b* is a circle-like member connecting the inner circle part of the first annular side 231*a* to the inner circle part of the second annular side 231*c*. The outer circle side 231*d* is a circle-like member connecting the outer circle part of the first annular side 231*a* to the outer circle part of the second annular side 231*c*. By connecting the first annular side 231*a*, the inner circle side 231*b*, the second annular side 231*c*, and the outer circle side 231*d*, the inner space 232 is formed. Note that how to connect each of the first annular side 231*a*, the inner circle side 231*b*, the second annular side 231*c*, and the outer circle side 231*d* is optionally selected in view of manufacturability and the like.

The heat exchange medium having flowed from the medium inlet 21 flows into each of the inner spaces 232 of the heat exchanger simple components 23 as configured in this manner, the heat exchange medium having flowed into exchanges heat with the exhaust gas, and then flows out from the medium outlet 22 to the outside. In this manner, the heat exchanger 40 performs the heat exchange by the flowing of the heat exchange medium inside the heat exchanger simple component 23 and the flowing of the exhaust gas through the inner heat exchange passage 401 between the plurality of heat exchanger simple components 23.

Further, it is preferable that diffusion means that diffuses the exhaust gas flowing into between the plurality of heat exchanger simple components 23 to the inner heat exchange passage 401, which is a space between the plurality of heat exchanger simple components 23.

In this embodiment, since the heat exchanger 40 is configured such that the plurality of heat exchanger simple components 23 is disposed while having the space through which the exhaust gas passes therebetween, the exhaust gas from the first heat exchange passage ZB1 toward the second heat exchange passage ZB2 can flow through the inner heat exchange passage 401, which is the space between the plurality of heat exchanger simple components 23. Further, even if the exhaust gas flowing into the first heat exchange passage ZB1 leans, by providing the diffusion means that diffuses the exhaust gas flowing into between the heat exchanger simple components 23 to the space, the exhaust gas can reach an area into which little exhaust gas has flowed from an area into which much exhaust gas has flowed. Therefore, the exhaust gas can reach the whole heat exchanger 40 and can exchange heat with the heat exchange medium more efficiently.

Figure 3:
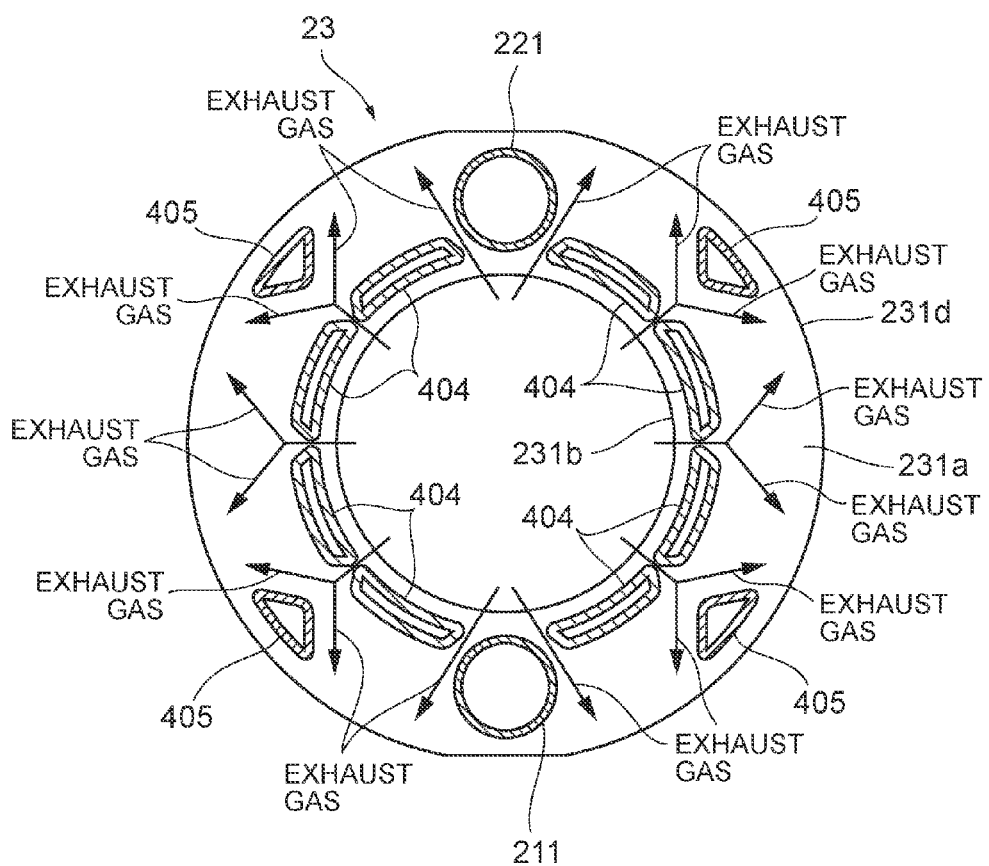
FIG. 3 is a schematic sectional view illustrating an I-I section of a heat exchanger simple component illustrated in FIG. 2.

With reference to FIG. 3, description is given of a specific example of the diffusion means. FIG. 3 is a schematic sectional view illustrating an I-I section in FIG. 2. As illustrated in FIG. 3, eight first convex portions 404, and four second convex portions 405 are disposed on the first annular side 231*a* of the heat exchanger simple component 23. A pipe 211 is a pipe connecting to the medium inlet 21, and a pipe 221 is a pipe connecting to the medium outlet 22.

The first convex portion 404 is formed as a convex portion having a wall surface rising for a predetermined distance along an edge of the first annular side 231a on the inner circle side 231b side. There is a gap between the adjacent first convex portions 404. The first convex portion 404 is disposed to abut on the first convex portion 404 of the second annular side 231c of the adjacent heat exchanger simple component 23, or to be close to it such that the flow of the exhaust gas is partially hindered when the heat exchanger simple components 23 are connected. Therefore, the first convex portion 404 is provided to partially restrict the inflow of the exhaust gas from the first heat exchange passage ZB1 to between the plurality of heat exchanger simple components 23.

In this manner, since the first convex portion 404 partially restricts the inflow of the exhaust gas to the space between the heat exchanger simple components 23, even if much exhaust gas flows into some areas between the heat exchanger simple components 23 while leaning, the first convex portion 404 can restrict it and allow an appropriate amount of the exhaust gas to flow in. The surplus exhaust gas hindered from flowing in with the first convex portion 404 goes round and flows into the other area between the heat exchanger simple components 23. As a result, the exhaust gas can reach the area into which little exhaust gas has flowed from the area into which much exhaust gas has flowed by the simple method of providing the projecting first convex portion 404 on the space between the heat exchanger simple components 23.

The second convex portion 405 is formed as a convex portion having a wall surface rising for a predetermined distance along an edge of the first annular side 231a on the outer circle side 231d side. The second convex portion 405 has a substantially triangular shape in plan view and is disposed such that a part corresponding to the base is along the edge of the outer circle side 231d and a part corresponding to the vertical angle faces the inner circle side 231b. Therefore, the second convex portion 405 is provided to partially restrict the outflow of the exhaust gas from between the plurality of heat exchanger simple components 23 to the second heat exchange passage ZB2.

In this manner, since the second convex portion 405 partially restricts the outflow of the exhaust gas from between the heat exchanger simple components 23 to the second heat exchange passage ZB2, a traveling direction of the exhaust gas flowing in between the heat exchanger simple components 23 can be changed, and time during which the exhaust gas is in contact with the heat exchanger simple component 23 can be longer. As a result, the time during which the exhaust gas is in contact with the heat exchanger simple component 23 can be obtained longer, and the heat exchange efficiency can be increased by the simple method of providing the second convex portion 405 different from the first convex portion 404 on the space between the heat exchanger simple components 23.

Figure 4:
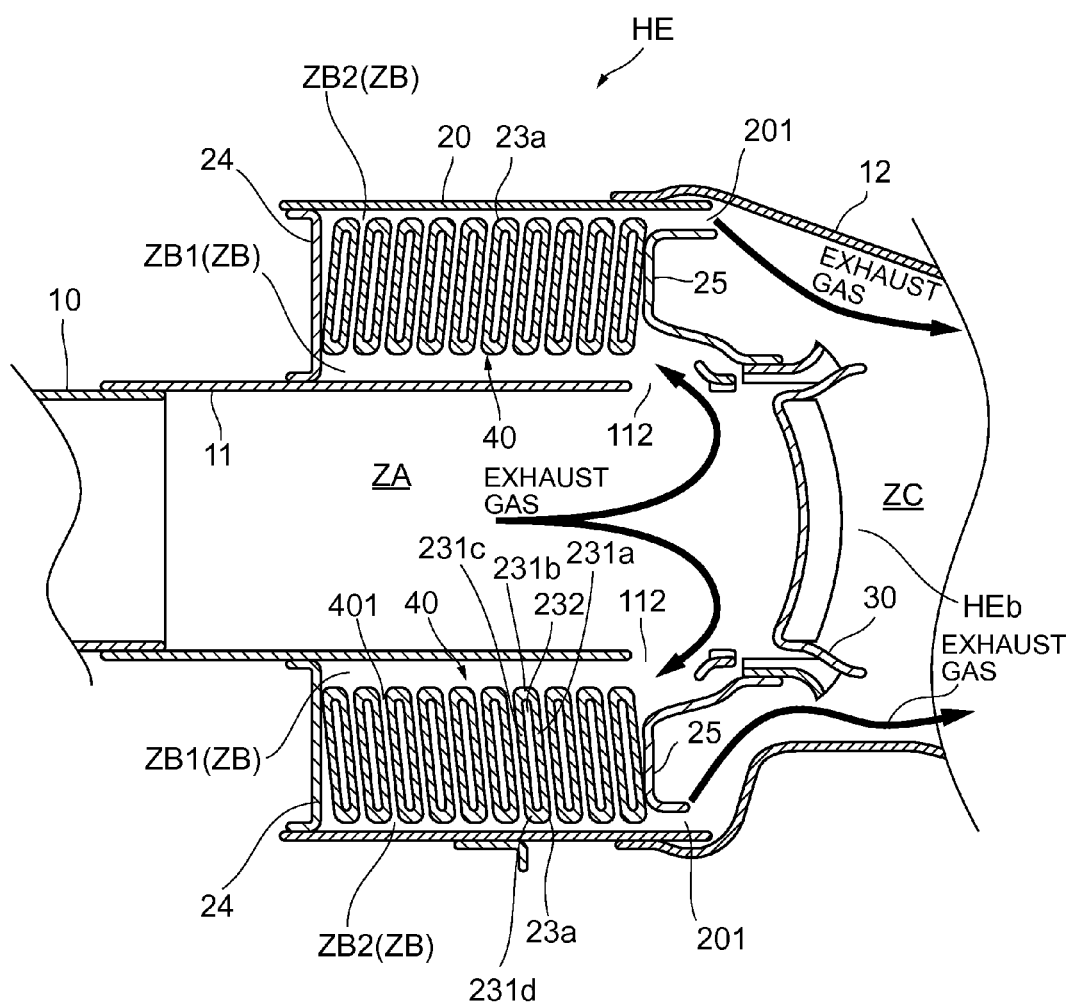
FIG. 4 is a partial schematic sectional view illustrating a modification example of the heat exchanger simple component illustrated in FIG. 2.

Note that, in the above description, the heat exchanger simple component 23 is configured to be like a plane plate, but it is also preferable aspect that it is modified to be a cup-like shape. The modification example is illustrated in FIG. 4. As illustrated in FIG. 4, a heat exchanger simple component 23a as the modification example is curved such that the inner circle side 231b recedes toward the upstream side, and the outer circle side 231d proceeds toward the downstream side.

In the embodiment described above, the description is given of the diffusion means using the first convex portion 404 and the second convex portion 405 provided on the heat exchanger simple component 23 as one example. The diffusion means is not limited to this and can be realized, for example, by disposing a cylindrical component formed with slits inside and outside the heat exchanger simple component 23.

Figure 5:
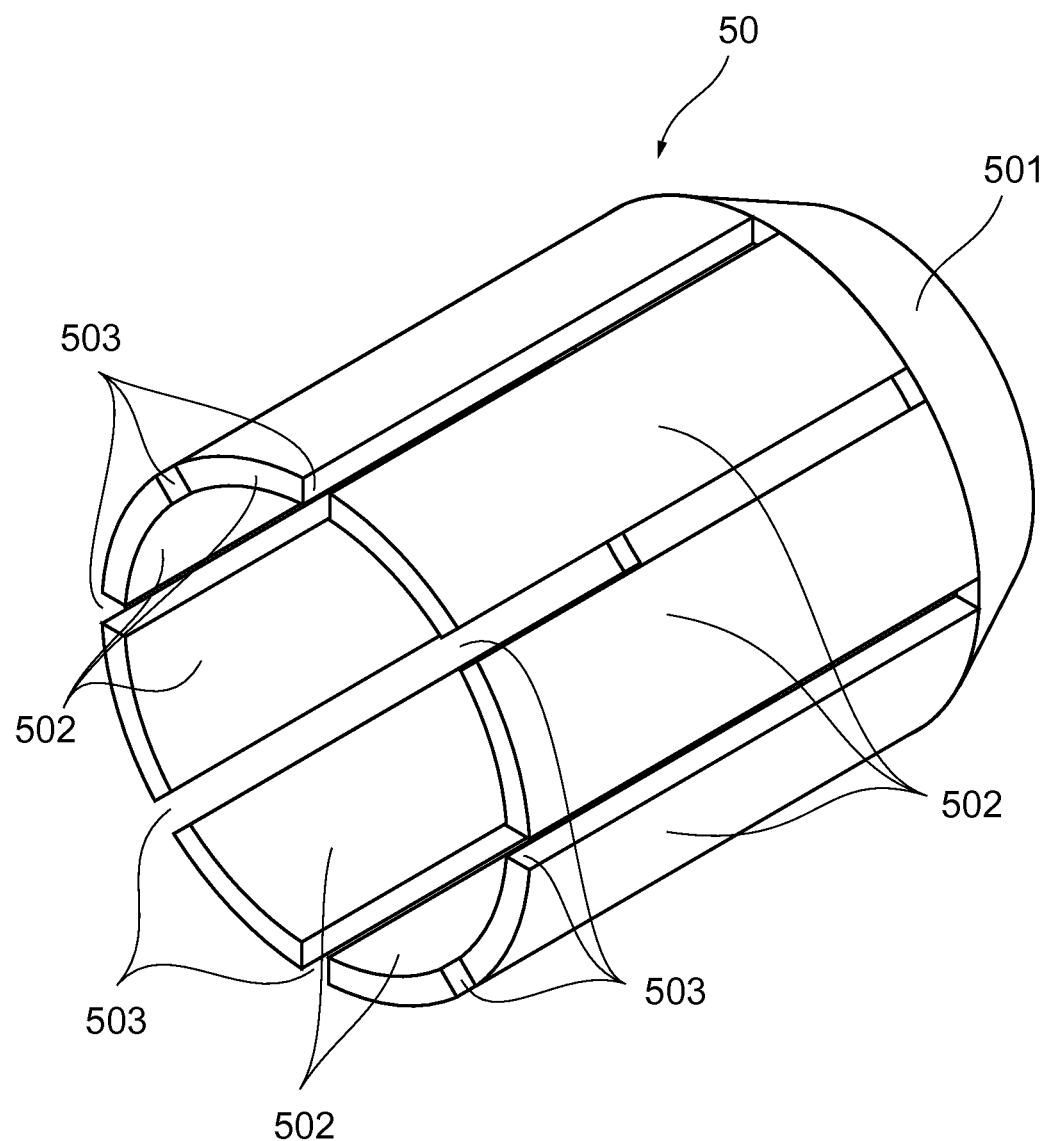
FIG. 5 is a perspective view illustrating an inner diffusion cylinder used in the exhaust heat recovery device illustrated in FIG. 1 to FIG. 3.
Figure 6:
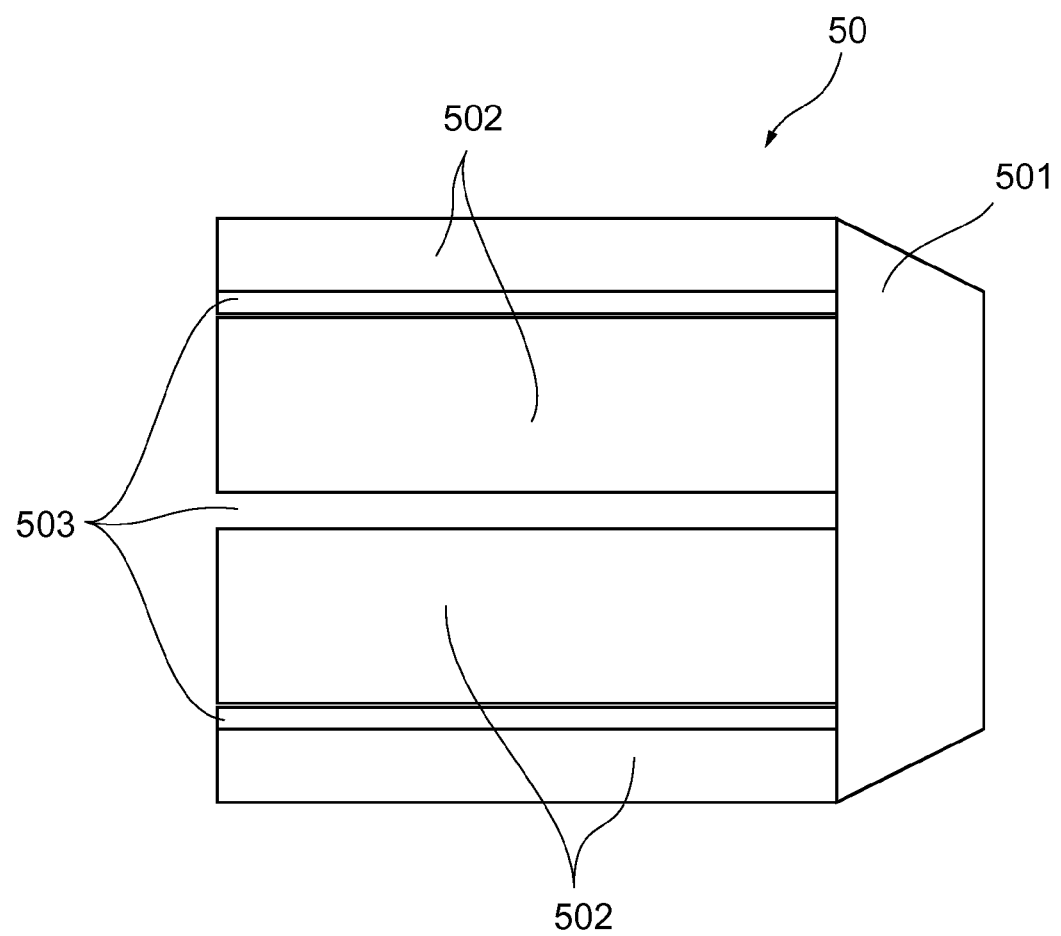
FIG. 6 is a lateral view of the inner diffusion cylinder illustrated in FIG. 5.
Figure 7:
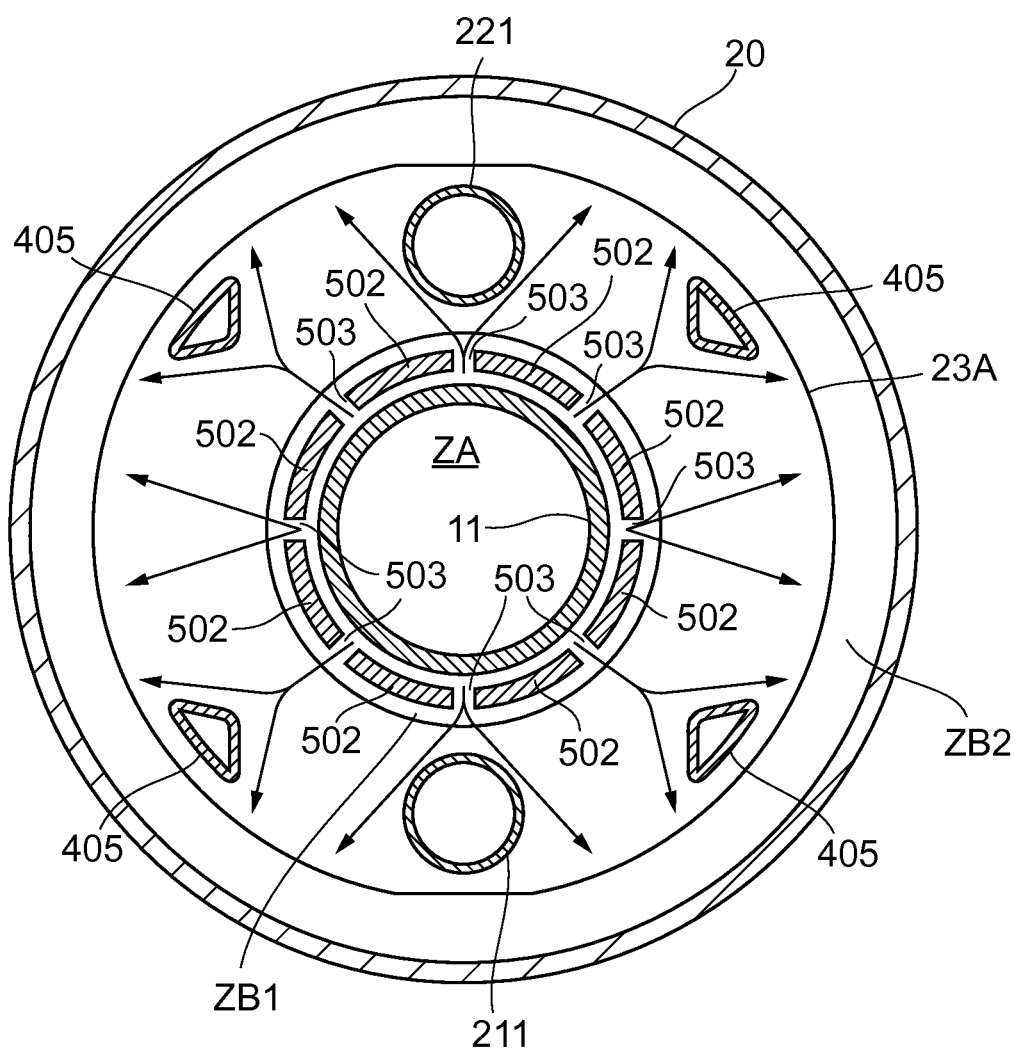
FIG. 7 is a schematic sectional view illustrating the inner diffusion cylinder illustrated in FIG. 5 and FIG. 6, and a modification example of the heat exchanger simple component combined with the inner diffusion cylinder.

With reference to FIG. 5 to FIG. 7, description is given of this modification example. FIG. 5 is a perspective view illustrating an inner diffusion cylinder 50 used in the exhaust heat recovery device HE. FIG. 6 is a lateral view of the inner diffusion cylinder 50 illustrated in FIG. 5. FIG. 7 is a schematic sectional view illustrating the inner diffusion cylinder 50 illustrated in FIG. 5 and FIG. 6, and a heat exchanger simple component 23A, which is the modification example of the heat exchanger simple component 23 combined with the inner diffusion cylinder 50.

As illustrated in FIG. 5 and FIG. 6, in the inner diffusion cylinder 50, eight diffusion plates 502 (first plate part) extend in the same direction from an end ring 501. A slit 503 is provided between the respective diffusion plates 502. Therefore, the inner diffusion cylinder 50 is formed with the slit along a longitudinal direction of the metal cylinder.

As illustrated in FIG. 7, the inner diffusion cylinder 50 is disposed between the heat exchanger simple component 23A and the inner cylinder 11. The diffusion plate 502 of the inner diffusion cylinder 50 is provided as the diffusion means instead of the first convex portion 404. Therefore, the heat exchanger simple component 23A is the heat exchanger simple component 23 from which the first convex portion 404 is omitted.

In this manner, the diffusion plate 502 of the inner diffusion cylinder 50 is provided to partially restrict the inflow of the exhaust gas from the first heat exchange passage ZB1 to between the plurality of heat exchanger simple components 23A. Since the diffusion plate 502 partially restricts the inflow of the exhaust gas to the space between the heat exchanger simple components 23A, even if much exhaust gas flows into some areas between the heat exchanger simple components 23A while leaning, the diffusion plate 502 can restrict it and allow an appropriate amount of the exhaust gas to flow in. The surplus exhaust gas hindered from flowing in with the diffusion plate 502 goes round and flows into the other area between the heat exchanger simple components 23A. As a result, the exhaust gas can reach an area into which little exhaust gas has flowed from an area into which much exhaust gas has flowed by the simple method of providing the diffusion plate 502 on the first heat exchange passage ZB1 on the inner side of the heat exchanger simple component 23.

Figure 8:
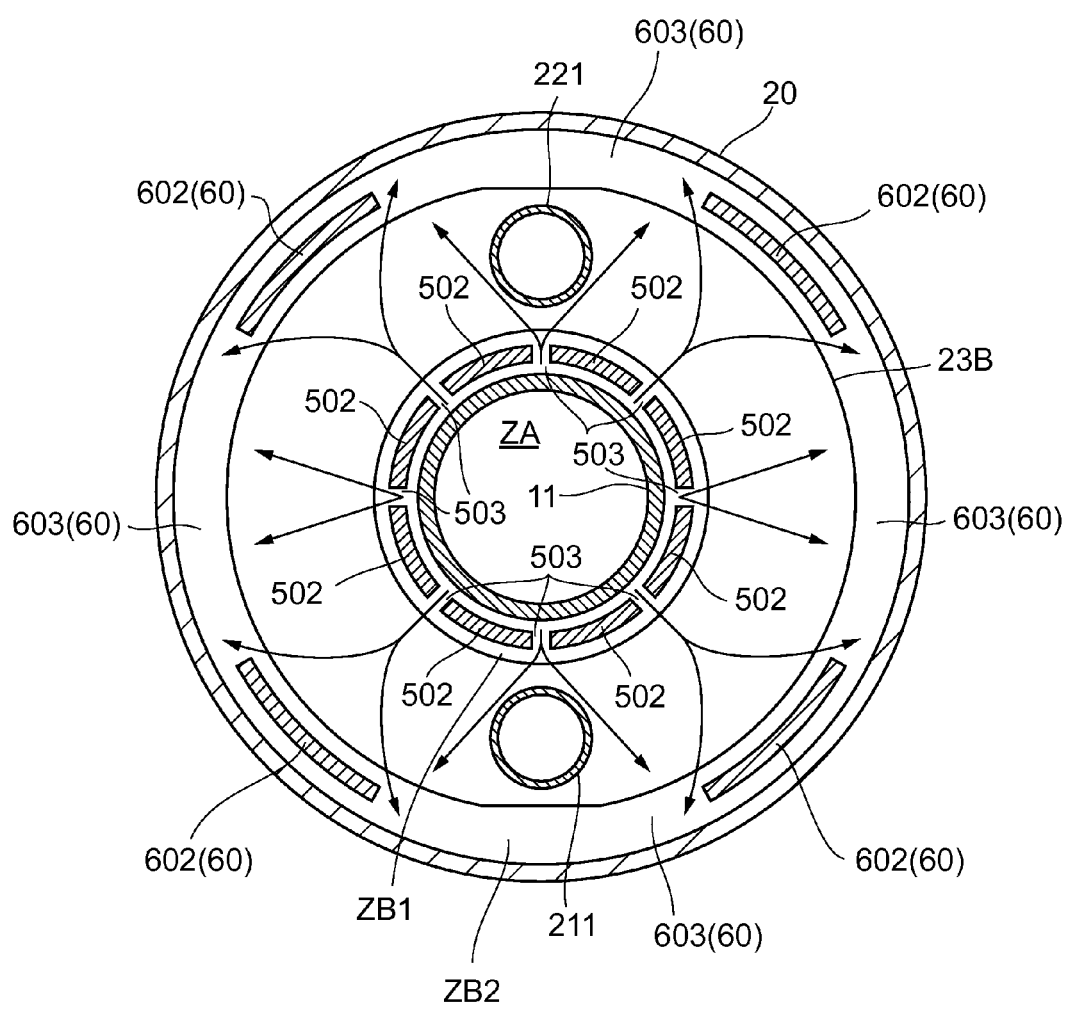
FIG. 8 is a schematic sectional view illustrating a case where the inner diffusion cylinder and an outer diffusion cylinder are used.

As the diffusion plate 502 is used instead of the first convex portion 404, it is also preferable aspect that an outer diffusion cylinder having a diffusion plate is used instead of the second convex portion 405. FIG. 8 is a schematic sectional view illustrating a case where the inner diffusion cylinder 50 and the outer diffusion cylinder 60 are used.

In the outer diffusion cylinder 60, four diffusion plates 602 (second plate part) extend in the same direction from an end ring (not illustrated). A slit 603 is provided between the respective diffusion plates 602.

As illustrated in FIG. 8, the outer diffusion cylinder 60 is disposed between the heat exchanger simple component 23B and the outer cylinder 20. The diffusion plate 602 of the outer diffusion cylinder 60 is provided as the diffusion means instead of the second convex portion 405. Therefore, the heat exchanger simple component 23B is the heat exchanger simple component 23A from which the second convex portion 405 is further omitted.

In this manner, the diffusion plate 602 of the outer diffusion cylinder 50 is provided to partially restrict the outflow of the exhaust gas from between the plurality of heat exchanger simple components 23B to the second heat exchange passage ZB2. Since the diffusion plate 602 partially restricts the outflow of the exhaust gas from between the heat exchanger simple components 23B to the second heat exchange passage ZB2, a traveling direction of the exhaust gas flowing in between the heat exchanger simple components 23B can be changed, and time during which the exhaust gas is in contact with the heat exchanger simple component 23B can be longer. As a result, the time during which the exhaust gas is in contact with the heat exchanger simple component 23B can be obtained longer, and the heat exchange efficiency can be increased by the simple method of providing the diffusion plate 602 on the second heat exchange passage ZB2 on the outer side of the heat exchanger simple component 23B.

Figure 9:
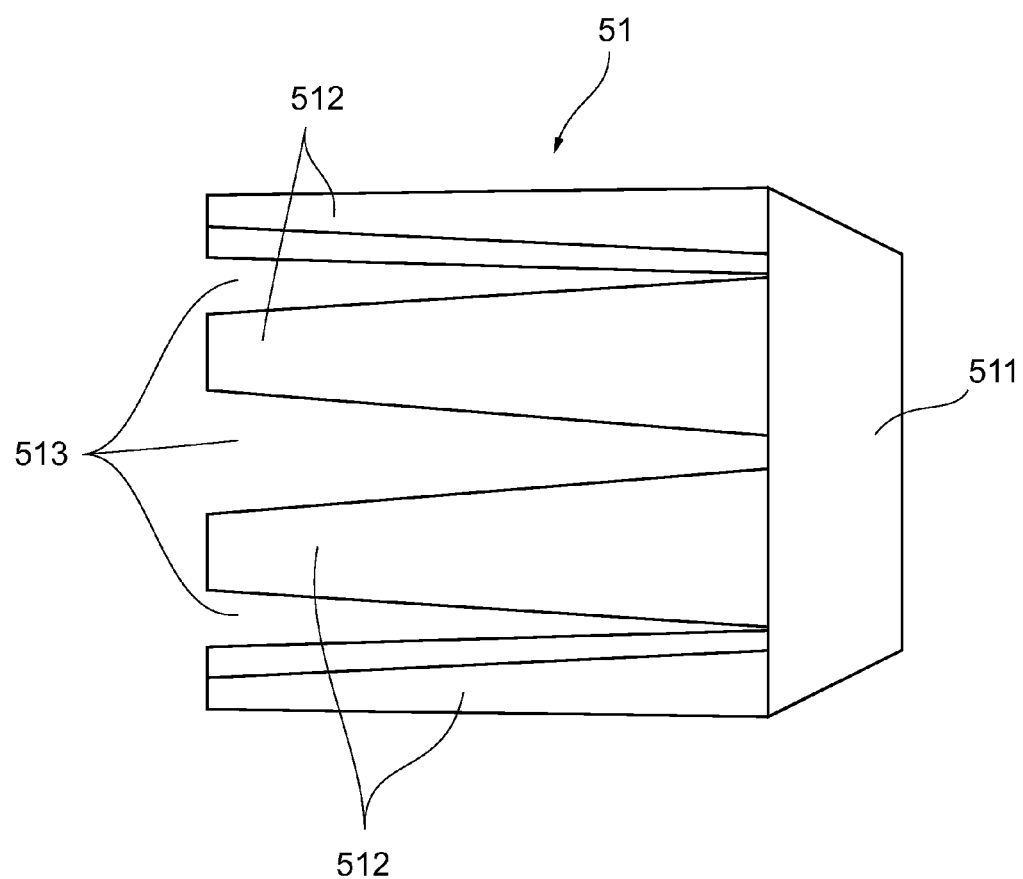
FIG. 9 is a lateral view illustrating a modification example of the inner diffusion cylinder illustrated in FIG. 5 and FIG. 6.

Note that, in the inner diffusion cylinder 50 and the outer diffusion cylinder 60 described above, the slit 503 and the slit 603 are formed to have the same width in a longitudinal direction, but the width of the slits can have various aspects depending on how the exhaust gas is allowed to flow to between the heat exchanger simple components. FIG. 9 is a lateral view illustrating an inner diffusion cylinder 51, which is a modification example of the inner diffusion cylinder 50 illustrated in FIG. 5 and FIG. 6. In the inner diffusion cylinder 51, eight diffusion plates 512 (first plate part) extend in the same direction from an end ring 511. A slit 513 is provided between the respective diffusion plates 512. A width of the diffusion plate 512 is configured to be wide in the end ring 511 side and become narrower as it is apart from the end ring 511. Therefore, a width of the slit 513 is configured to be narrow in the end ring 511 side and become wider as it is apart from the end ring 511. Since the exhaust gas enters from the end ring 511 side, the inflow of the exhaust gas to between the heat exchanger simple components 23A, 23B is restricted on the upstream side for the exhaust gas flow, and promoted on the downstream side for the exhaust gas flow, so that the exhaust gas can be introduced evenly to between the heat exchanger simple components 23A, 23B.

The embodiment described above is merely one example, and various omissions, substitutions, and modifications can be made without departing from the scope of the invention.

REFERENCE SIGNS LIST

HE: Exhaust heat recovery device
10: Upstream side exhaust pipe
11: Inner cylinder
12: Downstream side exhaust pipe
20: Outer cylinder
21: Medium inlet
22: Medium outlet
23: Heat exchanger simple component
24: Upstream side end plate
25: Downstream side end plate
30: Switching valve
ZA: Upstream side main passage
ZB: Heat exchange passage
ZB1: Inner side passage
ZB2: Outer side passage
ZC: Downstream side main passage
112: Side outflow port
113: Main outflow port
201: Suboutflow port
211: Pipe
221: Pipe
231*a*: Annular side
231*b*: Inner circle side
231*c*: Annular side
231*d*: Outer circle side
232: Inner space
401: Inner heat exchange passage
404: First convex portion
405: Second convex portion

The invention claimed is:

1. An exhaust heat recovery device performing a heat exchange between exhaust gas discharged from an internal combustion engine and a heat exchange medium, comprising:
  an inner member forming a part of a main passage that connects a receiving inlet receiving the exhaust gas flowing from an upstream side to a main sending outlet sending the received exhaust gas into a downstream side, and forming an upstream side main passage, which is a part of the receiving inlet side of the main passage;
  an outer member disposed to surround the inner member and forming a heat exchange passage with the inner member;
  a heat exchanger disposed on the heat exchange passage to surround the inner member and performing the heat exchange between the exhaust gas and the heat exchange medium; and
  a switching unit switching between a first mode in which the exhaust gas received with the main passage is passed through only the main passage to flow into the main sending outlet, and a second mode in which the exhaust gas received with the main passage flows from the upstream side main passage through the heat exchange passage into a subsending outlet different from the main sending outlet, wherein:
  the heat exchange passage includes a first heat exchange passage formed between the heat exchanger and the inner member, and a second heat exchange passage formed between the heat exchanger and the outer member,
  the inner member and the heat exchanger are disposed such that a heat exchange outflow port through which the exhaust gas flows out from the upstream side main passage into the first heat exchange passage is formed on an end of the first heat exchange passage on the main sending outlet side, and the subsending outlet is formed on an end of the second heat exchange passage on the main sending outlet side,
  in the second mode, the exhaust gas flows out from the heat exchange outflow port into the heat exchange passage, the exhaust gas having flowed out into the heat exchange passage flows in a radial direction from an inner side to an outer side of the heat exchanger while flowing through the first heat exchange passage toward the upstream side to reach the second heat exchange passage from the first heat exchange passage and flows through the second heat exchange passage toward the downstream side, and the heat exchange is performed in the heat exchanger while the exhaust gas flows,
  the heat exchanger is formed to have a shape along the inner member and the outer member respectively and includes a plurality of heat exchanger simple components disposed while being laminated with a predetermined interval therebetween, the heat exchanger performs the heat exchange by the flowing of the heat exchange medium inside each of the heat exchanger simple components and the flowing of the exhaust gas on a heat exchange area between the plurality of heat exchanger simple components, and the heat exchanger is disposed with a diffuser configured to diffuse the exhaust gas flowing into the heat exchange area in a circumferential direction of the heat exchange area.

2. The exhaust heat recovery device according to claim 1, wherein an upstream side end plate blocking an upstream end of the heat exchange passage is disposed between the inner member and the outer member such that the exhaust gas is prevented from flowing from an upstream side into the heat exchange passage.

3. The exhaust heat recovery device according to claim 1 or 2, wherein a downstream side end plate blocking a downstream end of the first heat exchange passage is disposed between the inner member and the outer member such that the exhaust gas flowing out from the heat exchange outflow port is introduced into the first heat exchange passage.

4. The exhaust heat recovery device according to claim 1, wherein the diffuser partially restricts the flowing of the exhaust gas from the first heat exchange passage to the heat exchange area.

5. The exhaust heat recovery device according to claim 4, wherein the diffuser includes a first convex portion formed on each of the heat exchanger simple components on the first heat exchange passage side.

6. The exhaust heat recovery device according to claim 4, wherein the diffuser includes a first plate part disposed along an inner side surface of the heat exchanger between the inner side surface of the heat exchanger and the first heat exchange passage.

7. The exhaust heat recovery device according to claim 1, wherein the diffuser partially restricts the flowing of the exhaust gas from the heat exchange area to the second heat exchange passage.

8. The exhaust heat recovery device according to claim 7, wherein the diffuser includes a second convex portion formed on each of the heat exchanger simple components on the second heat exchange passage side.

9. The exhaust heat recovery device according to claim 7, wherein the diffuser includes a second plate part disposed along an outer side surface of the heat exchanger between the outer side surface of the heat exchanger and the second heat exchange passage.

* * * * *